(12) United States Patent
Yu et al.

(10) Patent No.: US 11,018,527 B2
(45) Date of Patent: May 25, 2021

(54) WIRELESS POWER SUPPLY ASSEMBLY AND ELECTRONIC DEVICE

(71) Applicant: NINGBO WEIE ELECTRONICS TECHNOLOGY LTD., Zhejiang (CN)

(72) Inventors: Feng Yu, Zhejiang (CN); Weiyi Feng, Zhejiang (CN)

(73) Assignee: NINGBO WEIE ELECTRONICS TECHNOLOGY LTD., Ningbo (CN)

( * ) Notice: Subject to any disclaimer, the term of this patent is extended or adjusted under 35 U.S.C. 154(b) by 203 days.

(21) Appl. No.: 16/012,142

(22) Filed: Aug. 9, 2018

(65) Prior Publication Data

US 2020/0051736 A1 Feb. 13, 2020

(51) Int. Cl.
*H01F 38/14* (2006.01)
*H02J 50/12* (2016.01)
*H02J 50/00* (2016.01)
*H02J 7/02* (2016.01)

(52) U.S. Cl.
CPC ............ *H02J 50/12* (2016.02); *H02J 50/005* (2020.01); *H01F 38/14* (2013.01); *H02J 7/025* (2013.01)

(58) Field of Classification Search
CPC .... H01F 27/306; H01F 27/324; H01F 27/365; H01F 38/14; H02J 50/005; H02J 50/12; H02J 7/025
See application file for complete search history.

(56) References Cited

U.S. PATENT DOCUMENTS

| 2010/0007215 A1* | 1/2010 | Sakuma ................. H01F 27/36 307/104 |
| 2011/0210696 A1* | 9/2011 | Inoue ...................... H02J 7/025 320/108 |
| 2015/0097521 A1* | 4/2015 | Endou ................. H01F 27/2804 320/108 |

FOREIGN PATENT DOCUMENTS

| CN | 205142776 | 4/2016 |
| CN | 106899090 | 6/2017 |
| CN | 106911193 | 6/2017 |
| CN | 107492440 | 12/2017 |

* cited by examiner

*Primary Examiner* — Rexford N Barnie
*Assistant Examiner* — Elim Ortiz
(74) *Attorney, Agent, or Firm* — Andrus Intellectual Property Law, LLP

(57) ABSTRACT

A wireless power supply assembly and an electronic device are disclosed. By providing a gap between the magnetic sheet and the coil, dense magnetic lines of force closely abutting the coil pass through the gap to avoid passing through the magnetic sheet, thereby reducing loss due to the magnetic sheet. At the meanwhile, it is also possible to further avoid significant changes in coil inductance parameters caused by horizontal offset between the coil and the magnetic sheet due to installation errors, reduce the sensitivity of the resonance compensation capacitance of the wireless power supply assembly to the position and further reduce the loss. The present disclosure can effectively reduce the loss of the wireless power supply system and improve wireless power transmission efficiency.

9 Claims, 4 Drawing Sheets

WIRELESS POWER SUPPLY ASSEMBLY AND ELECTRONIC DEVICE

FIELD OF THE INVENTION

The present disclosure relates to power electronic technology, in particular, to wireless power supply technology, and more particularly, to a wireless power supply assembly and an electronic device using the same.

BACKGROUND

Wireless power supply technology can wirelessly transmit power between electronic devices and is thus widely used in consumer electronics and other types of electronic products. Wireless power supply technology usually achieves wireless transmission of the power through mutual electromagnetic coupling between a transmitting-side coil and a receiving-side coil.

In the prior art, a magnetic field of a coil is usually intensified by arranging a magnetic sheet to be closely attached to the coil so as to improve the coupling between the transmitting side and the receiving side. As shown in FIG. 1, a magnetic sheet 1, a coil 2 and a circuit board are usually stacked to form a wireless power supply assembly so as to reduce the volume of an electronic device. The circuit board is usually disposed on one side of the magnetic sheet 1 away from the coil 2 to reduce eddy current loss generated by metal wires on the circuit board responsive to a high-frequency magnetic field. However, even so, the loss of the system is still unsatisfactory.

SUMMARY

In view of this, the present disclosure provides a wireless power supply assembly and an electronic device to further reduce the loss of the electronic device and improve power transmission efficiency of the electronic device.

In a first aspect of the present disclosure, a wireless power supply assembly is provided which comprises:

a magnetic sheet; and, a coil stacked on the magnetic sheet and configured to wirelessly receive or transmit power;

wherein a gap is provided between the coil and the magnetic sheet so that an intensity of a magnetic field passing through the magnetic sheet is maintained within a predetermined range.

In one embodiment, the wireless power supply assembly further comprises:

a coil bearing member configured to bear the coil so that the gap is provided between the coil and the magnetic sheet.

In one embodiment, the coil bearing component is at least one insulating spacer disposed between the coil and the magnetic piece.

In one embodiment, the coil bearing member is provided with a hollow portion below the coil.

In one embodiment, the hollow portion is filled with a predetermined gap material and the gap material is in gaseous state, liquid state or solid state.

In one embodiment, the wireless power supply assembly further comprises:

a gap material layer disposed between the coil and the magnetic sheet to form the gap.

In one embodiment, the gap material is a material having a low magnetic permeability and a low electrical conductivity.

In one embodiment, the gap material layer comprises a plurality of stacked different material layers.

In one embodiment, the wireless power supply assembly further comprises:

a circuit board disposed on one side of the magnetic sheet away from the coil.

In one embodiment, a gap is provided between the circuit board and the magnetic sheet.

In a second aspect of the present disclosure, an electronic device adapted to wirelessly receive or transmit power is provided which comprises:

a wireless power supply assembly as stated above.

By providing a gap between the magnetic sheet and the coil, dense magnetic lines of force closely abutting the coil pass through the gap to avoid passing through the magnetic sheet, thereby reducing loss due to the magnetic sheet. At the meanwhile, it is also possible to further avoid significant changes in coil inductance parameters caused by horizontal offset between the coil and the magnetic sheet due to installation errors, reduce the sensitivity of the resonance compensation capacitance of the wireless power supply assembly to the position and further reduce the loss. The present disclosure can effectively reduce the loss of the wireless power supply system and improve wireless power transmission efficiency.

BRIEF DESCRIPTION OF THE DRAWINGS

The above and other objects, features and advantages of the present disclosure will become more apparent from the following description of the embodiments of the present disclosure with reference to the accompanying drawings in which.

DETAILED DESCRIPTION

Figure 1:
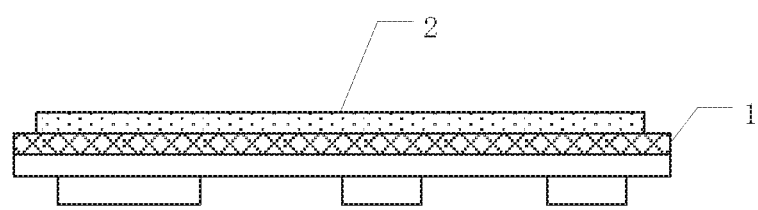
FIG. 1 is a schematic diagram of a wireless power supply assembly of the prior art.

Several embodiments of the present disclosure will be described in detail below with reference to the accompanying drawings, but the present disclosure is not limited to these embodiments. The present disclosure covers any alternatives, modifications, equivalent methods and schemes that are made in the nature and scope of the present disclosure. In order to give the public a thorough understanding of the present disclosure, specific details are described in detail in the following embodiments of the present disclosure, and the present disclosure can be fully understood by those skilled in the art without the description of these details.

It should be understood that directional terms such as "top", "bottom", "up", "down", "above", "below", "in", "inward", "out" and "outward" are used to assist in the description of the present disclosure based on the orientation in the embodiments shown in the drawings. The use of directional terms is intended to facilitate disclosure and should not be construed to limit the present disclosure to the illustrated one or more orientations.

It should be understood that when an element is referred to as being "connected" or "coupled" to another element, it can be directly connected or coupled to the other element or intervening elements may be present. In contrast, when an element is referred to be "directly connected" or "directly coupled" to another element, there are no intermediate elements. Other words used to describe the relationship between components should be understood in the same way (i.e., "between" versus "directly between", "adjacent" versus "directly adjacent", etc.).

Figure 2:
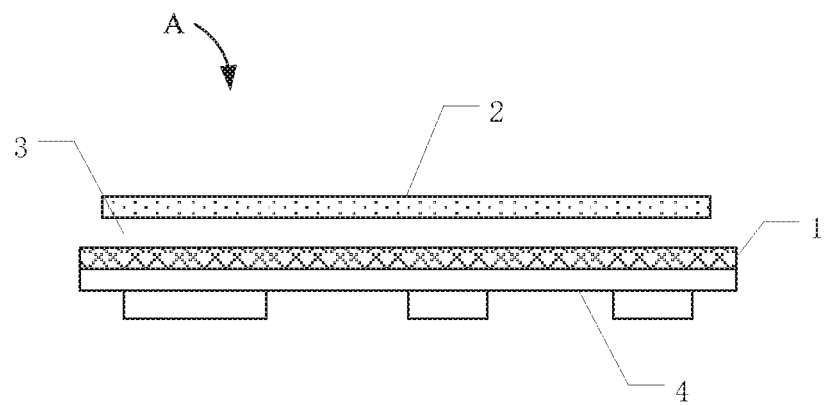
FIG. 2 is a schematic diagram of a wireless power supply assembly according to an embodiment of the present disclosure.

FIG. 2 is a schematic diagram of a wireless power supply assembly according to an embodiment of the present disclosure. As shown in FIG. 2, the wireless power supply assembly A of this embodiment may be a part of an electronic device having wireless power supply function. The electronic device may be a variety of electronic devices suitable for applying wireless power supply technology, such as smart phones, tablet computers, notebook computers, wearable electronic devices and the like. From the point of view of wireless power supply, the electronic device can be either a wireless power transmitting terminal or a wireless power receiving terminal. When applied in a wireless power transmitting terminal, the wireless power supply assembly A is configured to receive power from a power supply and wirelessly transmits it out. When applied in a wireless power receiving terminal, the wireless power supply assembly A is configured to couple with a corresponding transmitting-side coil to wirelessly receive power.

The wireless power supply assembly A comprises a magnetic sheet 1 and a coil 2. The magnetic sheet 1 may be formed of, for example, a soft magnetic material. The soft magnetic material may comprise a metal material or a ferrite material and may be implemented in various forms comprising balls, plates, tapes, foils, films and the like. For example, the magnetic sheet 1 may be a sheet, a tape, a foil, or a film comprising nickel-zinc (Ni—Zn) ferrite or manganese-zinc (Mn—Zn) ferrite. For another example, the magnetic sheet 1 may also be in the form of a single metal or alloy powder sheet containing at least one of iron, cobalt and nickel or in the form of a composite containing a polymer resin. For another example, the magnetic sheet 1 may be a metal belt, an alloy belt, a stacked belt, a foil, or a film containing at least one of iron, cobalt, and nickel. The magnetic sheet 1 is provided on one side of the coil 2 to increase the intensity of a magnetic field on the other side of the coil, so as to facilitate intensifying a coupling degree between a transmitting side and a receiving side of a wireless power supply system. The coil 2 may be a spiral conductive wire that substantially lies in a plane.

In the present embodiment, the coil 2 is not closely attached to the magnetic sheet 1 and a gap 3 is provided therebetween so that the magnetic field passing through the magnetic sheet 1 is maintained within a certain range. By setting the width of the gap 3, i.e., a distance between the plane where the coil 2 lies in and the plane where the magnetic sheet 1 lies in, the intensity of the magnetic field passing through the magnetic sheet 1 can be adjusted. At the meanwhile, by setting electrical conductivity and magnetic permeability of the gap 3, the intensity of the magnetic field passing through the magnetic sheet 1 can also be adjusted. By adjusting one of the above two parameters or adjusting the above two parameters simultaneously at the time of design, the magnetic field passing through the magnetic sheet 1 can be controlled within a predetermined range while ensuring the intensifying of the magnetic field above the coil 2 by the magnetic sheet 1.

In one embodiment, in order to save space, the circuit board 4 carrying a part or all of circuits of the electronic device may be disposed on one side of the magnetic sheet 1 away from the coil 2 (i.e., disposed on back side of the magnetic sheet). The circuit board 4 may be provided with an integrated circuit or separate circuit components to achieve power changes or other functions required by the electronic device.

Figure 3:
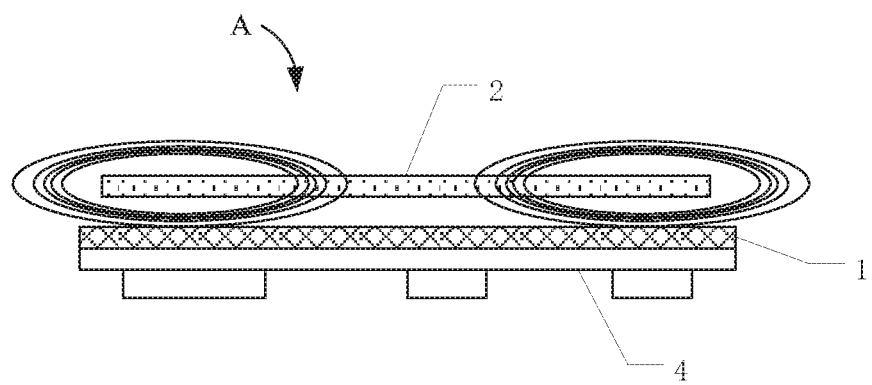
FIG. 3 is a schematic diagram of a magnetic field distribution of a wireless power supply assembly according to an embodiment of the present disclosure.

FIG. 3 is a schematic diagram of a magnetic field distribution of a wireless power supply assembly according to an embodiment of the present disclosure. As shown in FIG. 3, since the gap 3 is provided between the magnetic sheet 1 and the coil 2, when conducting electromagnetic coupling, the magnetic lines of force generated by the coil 2 have a relative high density at the positions close to the plane where the coil lies in. In the prior art, when the coil and the magnetic sheet are closely attached together, all the magnetic lines of force pass through the magnetic sheet. The alternating magnetic field that passes through the magnetic sheet will cause eddy current loss and magnetic hysteresis loss, thereby reducing efficiency. By providing the gap 3, dense magnetic lines of force close to the plane where the coil lies in will not pass through the magnetic sheet, so that the intensity of the alternating current magnetic field passing through the magnetic sheet can be greatly reduced, thereby reducing the loss caused thereby. Specifically, for a wireless charging assembly applied to a consumer electronic product, the width of the gap 3 may be set to 0.5 mm or more, preferably to 1 mm or more, whereby the intensity of the alternating current magnetic field passing through the magnetic sheet may be effectively controlled. The gap with such width is much larger than that required for normal heat dissipation.

Figure 4:
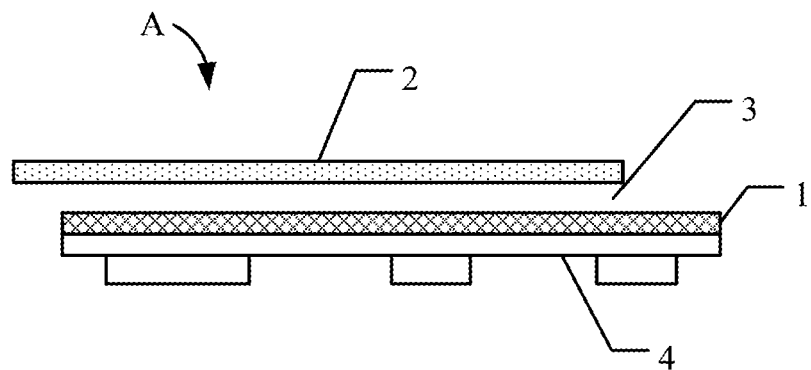
FIG. 4 is a schematic diagram of a wireless power supply assembly where there is a horizontal offset between a coil and a magnetic sheet according to an embodiment of the present disclosure.

At the meanwhile, when the magnetic sheet and the coil are closely attached together, if there is a horizontal offset between the position of the magnetic sheet and the position of the coil due to mounting error, an inductance value of the coil will change significantly, thus causing the resonant frequency point of the circuit to shift, which will reduce wireless transmission efficiency. As shown in FIG. 4, in the wireless power supply assembly of the present embodiment, when there is an offset between the position of the magnetic sheet 1 and the position of the coil 2 in horizontal direction, since the gap 3 is provided between the magnetic sheet 1 and the coil 2, the inductance value of the coil does not change significantly, which can significantly reduce sensitivity of resonant compensation capacitance and increase wireless power transmission efficiency.

Figure 5:
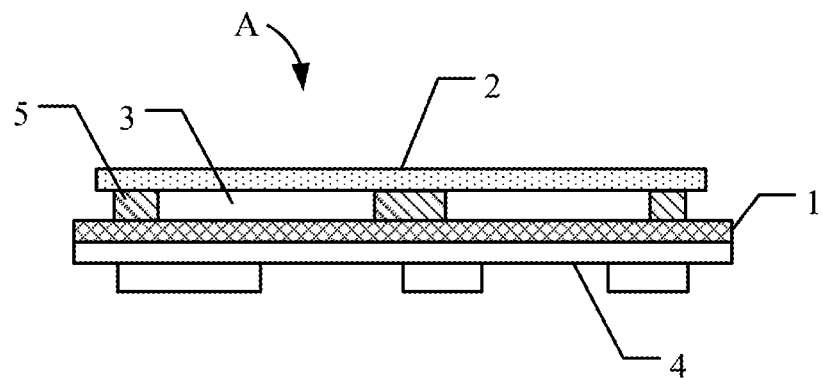
FIG. 5 is a schematic diagram of an alternative implementation of the embodiment of the present disclosure.

In the present disclosure, the gap 3 can be set in various ways. FIG. 5 is a schematic diagram of an alternative implementation of the embodiment of the present disclosure. As shown in FIG. 5, a coil bearing member 5 is provided between the magnetic sheet 1 and the coil 2 to form the gap 3. In the present implementation, the coil bearing member 5 is one or more insulating spacers disposed between the coil 2 and the magnetic sheet 1 and is in contact with a part of the coil so that the coil 2 does not contact the magnetic sheet 1 to form the gap 3 in the air. Since the air is a medium with a low magnetic permeability and a low electric conductivity and will not change the direction of a magnetic field or an electric field, it is thus possible to effectively prevent dense magnetic lines of force close to the coil 2 from passing through the magnetic sheet, thereby reducing loss. The insulating spacer can be formed to be significantly smaller than the area covered by the coil.

Figure 6:
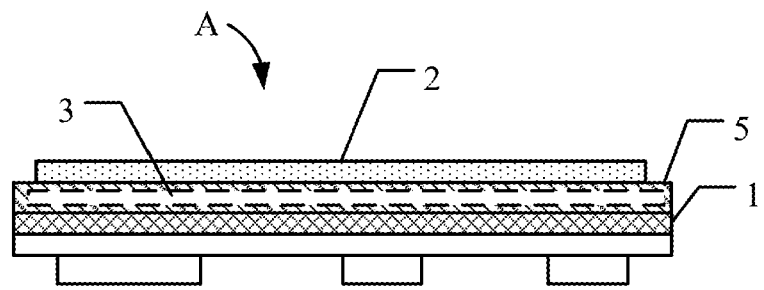
FIG. 6 is a schematic diagram of another alternative implementation of the embodiment of the present disclosure.
Figure 7:
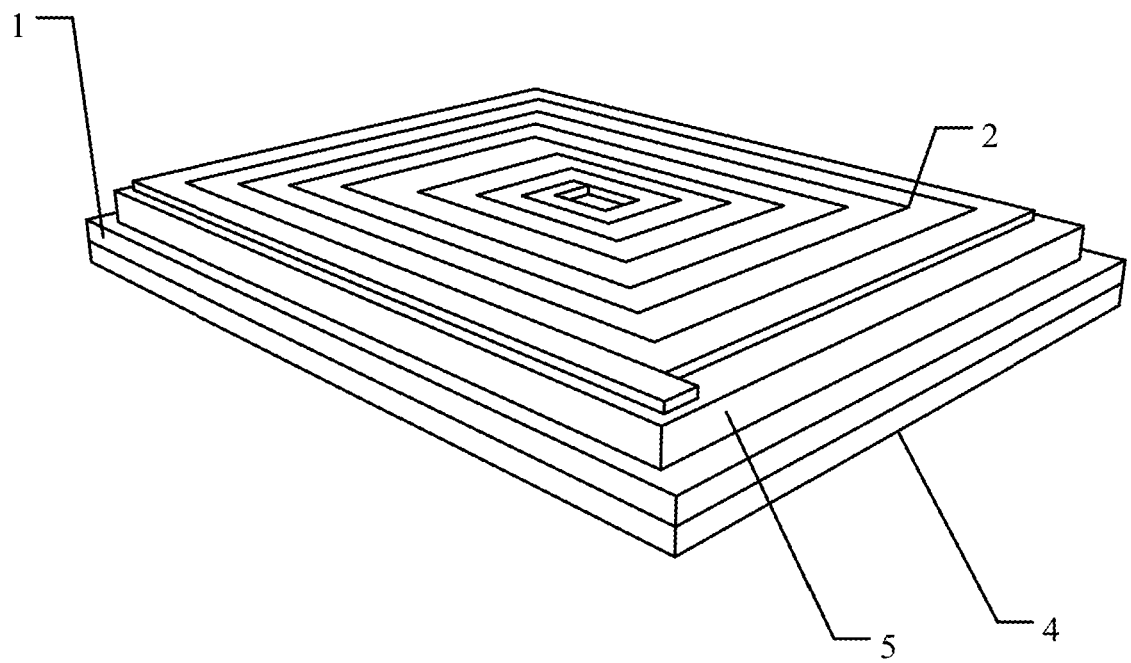
FIG. 7 is a schematic perspective view of another alternative implementation of the embodiment of the present disclosure.

Alternatively, the coil bearing member 5 may also be formed as a member having a hollow structure. As shown in FIG. 6 and FIG. 7, the coil bearing member 5 can be formed as a sealed box-like structure, the upper side of which is used for bearing the coil 2, the lower side of which is in contact with the magnetic sheet 1, and the middle portion of which is hollow and maintains vacuum or is filled with gap material in gaseous state, liquid state or solid state. The gap material may be selected according to practical requirements as long as it has a low magnetic permeability and a low electrical conductivity. In the present embodiment, a low magnetic permeability means that the magnetic permeability of a material is below a predetermined magnetic permeability threshold, and a low electrical conductivity means that the electrical conductivity of a material is below a predetermined electrical conductivity threshold. Such structure is particularly effective when the gap 3 is set to be large and the used gap material is in liquid state or gaseous state. Of course, the bearing member 5 itself needs to be made of insulating material with a low magnetic permeability.

Figure 8:
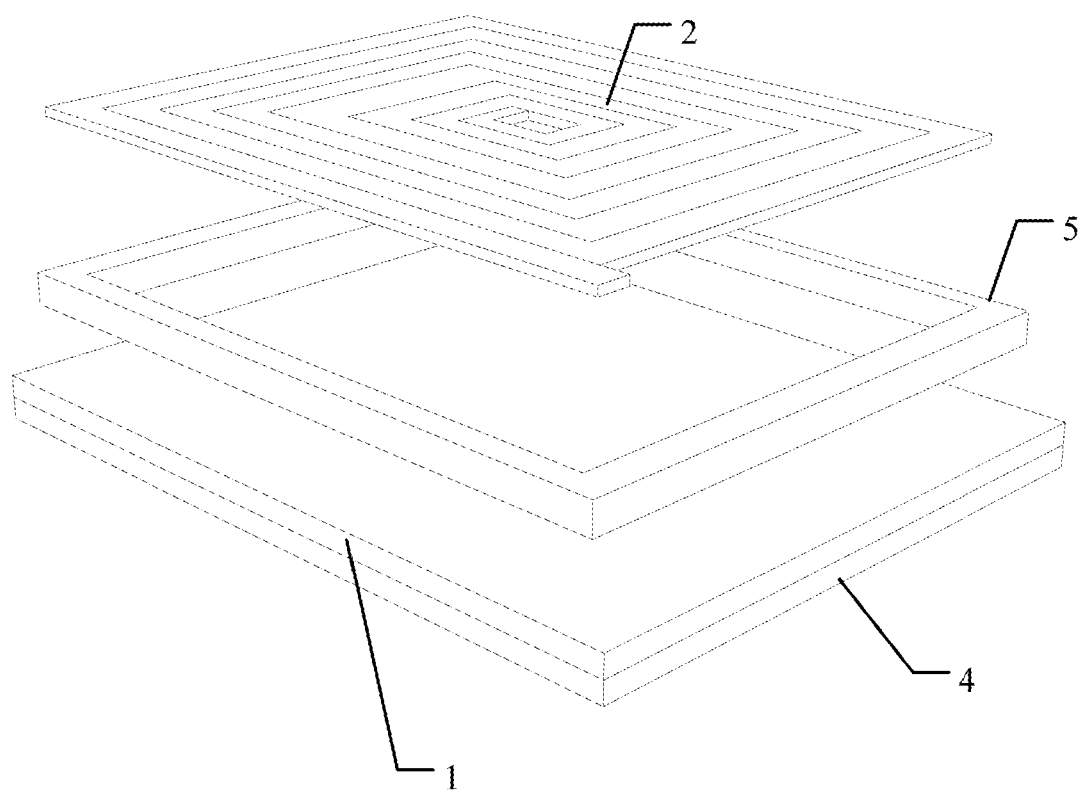
FIG. 8 is a schematic diagram in separated parts of yet another alternative implementation of the embodiment of the present disclosure.

Alternatively, as shown in FIG. 8, the coil bearing member 5 may also be formed as an annular structure that is hollow in the middle, an annular portion thereof may bear the coil 2, and a hollow portion in the middle forms a hollow space below the coil which may not be filled with material so that the gap is filled with air, however, the gap may also be filled with solid gap material.

Figure 9:
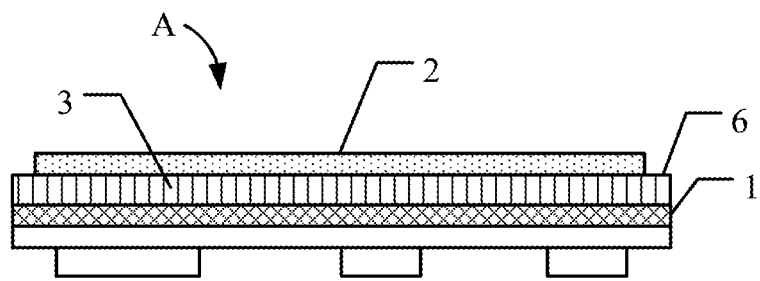
FIG. 9 is a schematic diagram of still another alternative implementation of the embodiment of the present disclosure.

In another specific embodiment, as shown in FIG. 9, the gap 3 is formed by a gap material layer 6 disposed between the coil 2 and the magnetic sheet 1. The gap material layer 6 adopts gap material with a low magnetic permeability and a low electrical conductivity. The gap material layer 6 may be deposited on the magnetic sheet 1 by various physical or chemical processes, or may be separately formed and then disposed between the magnetic sheet 1 and the coil 2. In one embodiment, the gap material layer 6 may comprise a plurality of sub-layers of different materials, whereby the gap material layer 6 may be formed in the form of a composite layer. Forming the gap through the gap material layer 6 can provide a more stable support for the coil 2 and at the same time can reduce the requirements for installation accuracy.

Figure 10:
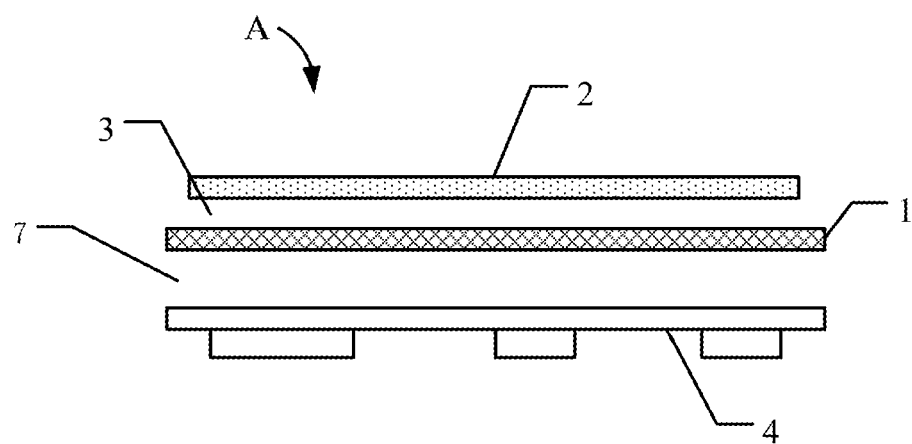
FIG. 10 is a schematic diagram of a wireless power supply assembly according to another embodiment of the present disclosure.

FIG. 10 is a schematic diagram of a wireless power supply assembly according to another embodiment of the present disclosure. As shown in FIG. 10, in the present embodiment, in addition to providing a gap 3 between the coil 2 and the magnetic sheet 1, a gap 7 is also provided between the magnetic sheet 1 and the circuit board 4. As a result, a gap exists between the coil 2 and the magnetic sheet 1 and between the magnetic sheet 1 and the circuit board 4. Since a part of the alternating magnetic field will pass through the magnetic sheet 1 to interact with metal pattern on the circuit board 4 to generate eddy current and increase the loss of the system when the circuit board 4 and the magnetic sheet 1 are closely attached together, providing a gap 7 between the magnetic sheet 1 and the circuit board 4 can further reduce the magnetic field that will pass through the circuit board 4 and keep it within a certain range on the premise that the gap 3 reduces the magnetic field passing through the circuit board 4. This can reduce the loss due to the interaction of the alternating current magnetic field with the metal pattern on the circuit board, and further improve wireless power transmission efficiency.

The gap 7 is obtained by the same or similar way as that for forming the gap 3, i.e., achieving interval by using a bearing member or by providing a gap material layer.

All the wireless power supply assemblies according to the embodiments of the present disclosure can be applied to an electronic device for wireless (or referred as non-contact) power transmission as a power transmitting terminal or a power receiving terminal.

According to the embodiment of the present disclosure, by providing a gap between the magnetic sheet and the coil, dense magnetic lines of force closely abutting the coil pass through the gap to avoid passing through the magnetic sheet, thereby reducing loss due to the magnetic sheet. At the meanwhile, it is also possible to further avoid significant changes in coil inductance parameters caused by horizontal offset between the coil and the magnetic sheet due to installation errors, reduce the sensitivity of the resonance compensation capacitance of the wireless power supply assembly to the position and improve the efficiency. The embodiments of the present disclosure can effectively reduce the loss of the wireless power supply system and improve wireless power transmission efficiency.

The above description is a description of the embodiments of the present disclosure. Various changes and modifications may be made without departing from the scope of the present disclosure. The present disclosure is presented for illustrative purposes and should not be interpreted as an exclusive description of all embodiments of the present disclosure or as limiting the scope of the present disclosure to the specific elements illustrated and described in conjunction with these embodiments. Any one or more of the individual elements of the described disclosure may be replaced by a replacement element that provides substantially similar functionality or otherwise provides a sufficient operation without any limitation. This comprises currently known replacement elements, such as those currently known to those skilled in the art, as well as the replacement elements that may be developed in the future, such as those that the skilled in in the art might recognize as an alternative at the time of development.

What is claimed is:

1. A wireless power supply assembly comprising:
   a magnetic sheet; and,
   a coil stacked on the magnetic sheet and configured to wirelessly receive or transmit power; and
   a coil bearing member configured to bear the coil so that a gap is provided between the coil and the magnetic sheet;
   wherein a width of the gap is set to 0.5 mm or more so that an intensity of a magnetic field passing through the magnetic sheet is maintained within a predetermined range,
   wherein the coil bearing member is formed as a sealed box-like structure and is provided with a hollow portion below the coil, a middle portion of the coil bearing member is hollow and maintains vacuum or is filled with gap material in gaseous state or liquid state.

2. The wireless power supply assembly of claim 1, wherein the gap material is a material with a low magnetic permeability and a low electrical conductivity.

3. The wireless power supply assembly of claim 1, wherein the gap material layer comprises a plurality of stacked different material layers.

4. The wireless power supply assembly of claim 1, further comprising:
 a circuit board disposed on one side of the magnetic sheet away from the coil.

5. The wireless power supply assembly of claim 4, wherein a gap is provided between the circuit board and the magnetic sheet.

6. The wireless power supply assembly of claim 1, wherein the coil bearing member is made of insulating material.

7. The wireless power supply assembly of claim 1, wherein the width of the gap is set to 1 mm or more.

8. The wireless power supply assembly of claim 1, wherein the gap is filled with air.

9. An electronic device adapted to wirelessly receive or transmit power comprising:
 a wireless power supply assembly comprising:
 a magnetic sheet;
 a coil stacked on the magnetic sheet and configured to wirelessly receive or transmit power; and
 a coil bearing member configured to bear the coil so that a gap is provided between the coil and the magnetic sheet;
 wherein the width of the gap is set to 0.5 mm or more so that an intensity of a magnetic field passing through the magnetic sheet is maintained within a predetermined range,
 wherein the coil bearing member is formed as a sealed box-like structure and is provided with a hollow portion below the coil, a middle portion of the coil bearing member is hollow and maintains vacuum or is filled with gap material in gaseous state or liquid state.

* * * * *